United States Patent [19]

Rose

[11] 3,995,594
[45] Dec. 7, 1976

[54] COMBINATION HAY HANDLER AND FEEDER

[76] Inventor: Wayne A. Rose, Rte. 1, Carrollton, Mo. 64633

[22] Filed: Oct. 16, 1975

[21] Appl. No.: 622,986

[52] U.S. Cl. .................................. 119/60
[51] Int. Cl.² ........................................ A01K 5/00
[58] Field of Search ............... 119/60, 58; 214/621

[56] References Cited
UNITED STATES PATENTS

| | | | |
|---|---|---|---|
| 3,797,460 | 3/1974 | Blankenship | 119/17 |
| 3,840,135 | 10/1974 | Bridge | 214/621 |
| 3,892,202 | 7/1975 | Feterl | 119/60 |

Primary Examiner—Hugh R. Chamblee
Attorney, Agent, or Firm—Lowe, Kokjer, Kircher, Wharton & Bowman

[57] ABSTRACT

A fork lift for carrying large hay bales in combination with a feed rack comprising barred panels through which animals are able to feed on the bales. The lift is coupled to the three point hitch of a tractor and backed against the feed rack to position the rack around the bale and to insert the forks of the lift beneath the bale. The lift includes notched arms which lift the feed rack above the ground when the lift is raised for transport of the bale. Lowering of the lift deposits the bale on the ground within the feed rack and automatically uncouples the lift from the rack.

10 Claims, 4 Drawing Figures

COMBINATION HAY HANDLER AND FEEDER

BACKGROUND AND SUMMARY OF THE INVENTION

This invention relates generally to the handling of hay and more particularly to an apparatus for transporting and feeding large hay bales.

The recent popularity of large hay bales among farmers and ranchers has led to difficult problems in handling the hay because of the large size and weight of the bales, which are several feet in diameter and weigh hundreds of pounds. Since manual handling is virtually precluded, specialized equipment of various types has been developed for loading and transporting the hay bales. This equipment has not been wholly satisfactory in a number of respects, primarily because of its expense and complexity. Furthermore, safety problems have been encountered in loading and unloading the large bales with existing equipment, and the bales are somewhat unstable during transport.

The large bales have also been difficult to feed to animals because existing hay racks and hay bunks are too small to accommodate them. In addition, existing hay handling units typically include a lift which is not well suited to unload the large bales in a suitable area for feeding animals. Consequently, many farmers and ranchers presently feed the large bales in an open area of the ground, which results in the hay becoming contaminated by the animals and thereby wasted to a large extent.

It is an important object of the present invention to provide a hay handling apparatus which includes a lift for transporting large hay bales in combination with a feeding rack within which the bale is contained.

Another object of the invention is to provide a hay handling apparatus wherein the lift and feeding rack are separate units which are automatically coupled together for cooperation to load and carry the bale, and which automatically uncouple when the bale is unloaded for feeding.

A further object of the invention is to provide a hay handling apparatus of the character described in which the lift is of improved construction in order to load, transport, and unload bales in a quick and easy manner with improved safety and stability.

Yet another object of the invention is to provide hay handling apparatus of the character described in which the lift may be quickly and easily hitched to the tractor for raising and lowering by the hydraulic system of the tractor.

An additional object of the invention is to provide hay handling apparatus of the character described which includes a feed rack of sufficient size to accommodate even the largest bales.

A still further object of the invention is to provide hay handling apparatus of the character described which includes an improved rear gate structure on the feed rack.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views.

Figure 1:
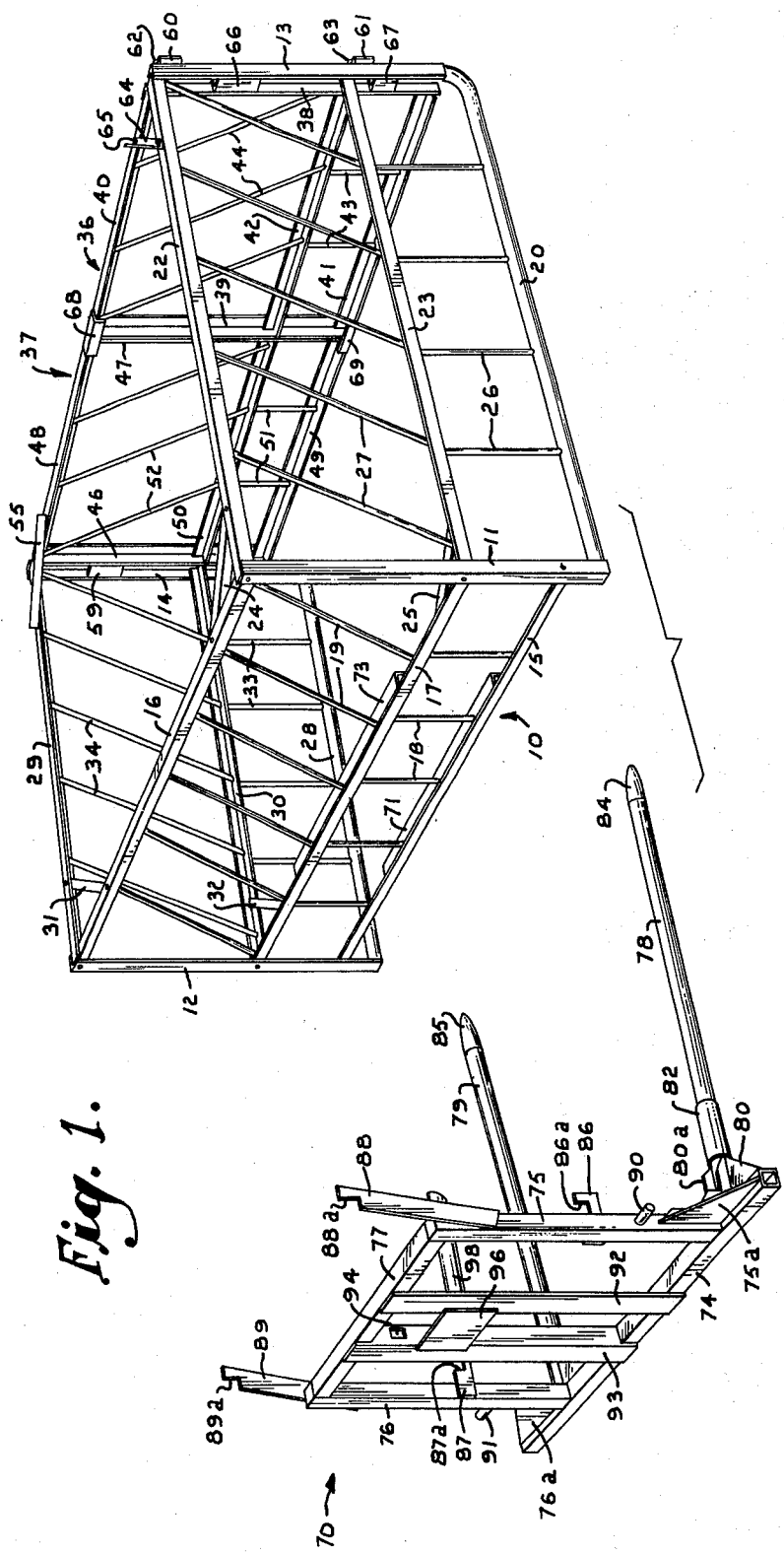
FIG. 1 is a perspective view illustrating a hay handling device constructed according to the invention, the fork lift and feed rack being shown as separated from one another.

Referring now to the drawings in detail, a feeding rack constructed according to the invention is generally designated by reference numeral 10. The feed rack 10 includes left and right front corner posts 11 and 12 and left and right rear corner posts 13 and 14, all of which are preferably upright angle sections. The front panel of rack 10 includes a lower angle member 15 which is secured to extend horizontally between posts 11 and 12 slightly above their lower ends. An upper angle member 16 extends between the top ends of posts 11 and 12, while an intermediate angle member 17 extends between posts 11 and 12 at a location between members 15 and 16. A series of upright bars 18 are secured to extend between members 15 and 17 at sufficient spacing to permit animals to extend their heads between the bars. A series of bars 19 extend at an inclined angle between members 16 and 17 at sufficient spacing to accommodate the heads of animals.

The left side panel of the feed rack includes a lower side rail 20 which extends between the lower ends of posts 11 and 13. Side rail 20 is preferably a tubular member to permit it to readily slide along the ground. The rearward end of side rail 20 is bent upwardly in a smoothly curved manner to connect to posts 13 at a position spaced above the ground.

The left side panel further includes an upper angle member 22 which extends horizontally between the top ends of posts 11 and 13. An intermediate angle member 23 extends between posts 11 and 13 at a position between members 20 and 22. A brace 24 is bolted to angle between members 16 and 22, and another brace 25 is bolted to angle between members 17 and 23. A series of spaced lower bars 26 extend vertically between members 20 and 23. Spaced upper bars 27 extend between members 22 and 23 at an inclined angle. The right side panel of feed rack 10 is constructed identically to the left side panel. A lower side rail 28 extends between posts 12 and 14 and normally rests on the ground. The rearward end of rail 28 is bent upwardly in a smoothly curved manner to facilitate its sliding movement along the ground. An upper angle member 29 extends between the top ends of posts 12 and 14, and an intermediate angle member 30 extends horizontally between posts 12 and 14 at a location between members 28 and 29. Braces 31 and 32 angle between members 16 and 29 and members 17 and 30, respectively. Spaced lower bars 33 extend vertically between members 28 and 30, and spaced upper bars 34 extend at an inclined angle between members 29 and 30.

The side panels and front panel are preferably bolted together at the front corner posts 11 and 12 to permit quick and easy disassembling of the feeding rack.

A pair of rear gates 36 and 37 are hinged to the rear corner posts 13 and 14, respectively. Each gate 36 and 37 is supported a short distance above the ground. Gate 36 includes upright angle members 38 and 39 at its opposite ends which are interconnected at their top ends by an upper angle member 40 and at their bottom ends by a lower angle member 41. An intermediate angle member 42 extends between members 38 and 39 at a position between members 40 and 41. Spaced lower bars 43 extend vertically between members 41 and 42, and spaced upper bars 44 slant between members 40 and 42.

Gate 37 is constructed similarly to gate 36. Gate 37 includes upright angle members 46 and 47 at its ends and upper, lower, and intermediate angle members 48, 49 and 50 extending horizontally between members 46 and 47. Spaced lower bars 51 are secured to extend vertically between members 49 and 50, and spaced upper bars 52 slant between members 48 and 50.

Figure 4:
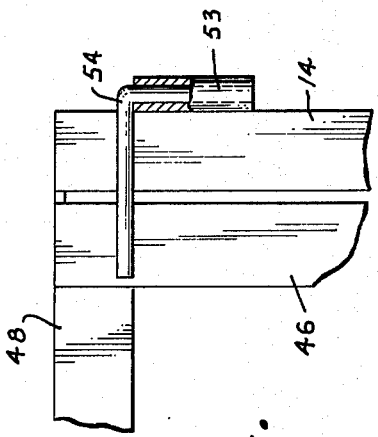
FIG. 4 is a fragmentary view on an enlarged scale taken generally along line 4—4 of FIG. 3 in the direction of the arrows, with a portion of the hinge sleeve shown in cross section.
Figure 3:
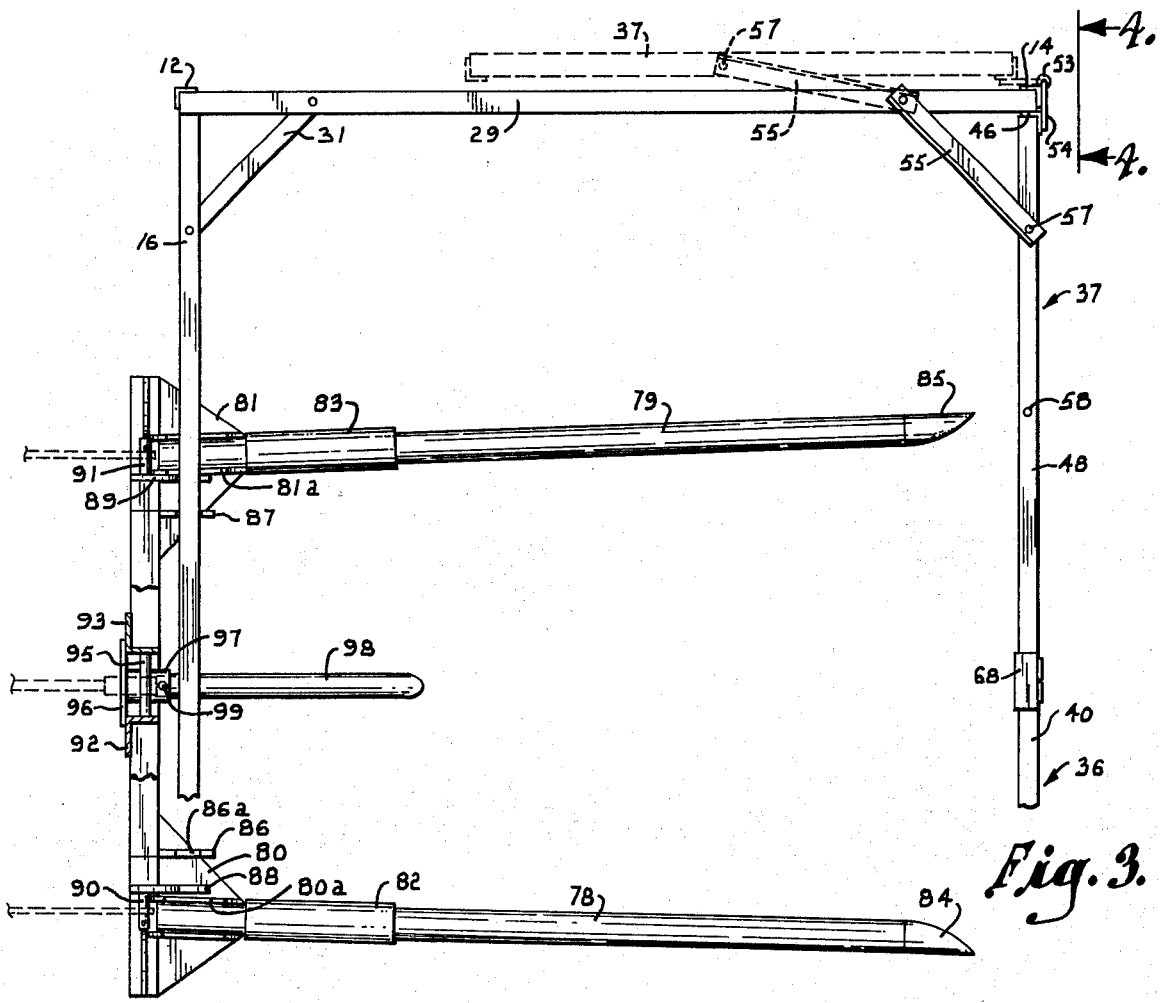
FIG. 3 is a fragmentary top plan view of the fork lift and the feeding rack coupled together, with the broken lines indicating one of the rear gates in its open position.

As best illustrated in FIGS. 3 and 4, gate 37 is hinged to post 14 by means of a small vertical sleeve 53 and a bent hinge pin 54. Sleeve 53 is welded to the corner of post 14 at a location slightly below the top end thereof. As shown in FIG. 4, pin 54 includes a horizontal portion which is welded flushly against one flange of angle member 46 and a verticle portion which fits rotatively in sleeve 53. The hinge connection between pin 54 and sleeve 53 permits gate 37 to be swung between the closed position shown in solid lines in FIG. 3 and the open position shown in broken lines in FIG. 3. A second sleeve (not shown) is welded to post 14 at a position below sleeve 53, and a second bent hinge pin (also not shown) is welded to angle member 46 and is rotatively received in this second sleeve to cooperate in hingedly mounting gate 37.

Figure 2:
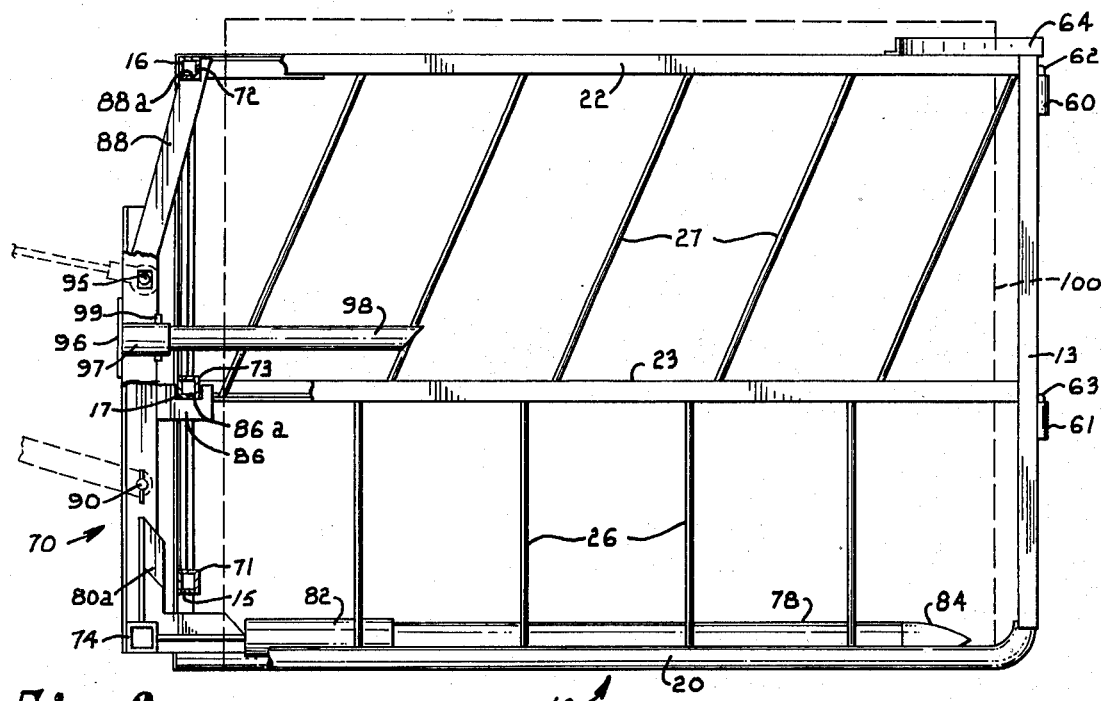
FIG. 2 is a side elevational view of the fork lift and feeding rack coupled together, with a large hay bale and the three point hitch of a tractor being shown in broken lines.

As best shown in FIG. 3, a brace 55 in the form of a short angle section is pivotally connected at one end to member 29 by a bolt 56. The opposite end of brace 55 may be pinned to member 48 by a pin 57. This secures brace 55 in a position angling between members 29 and 48 to thereby retain gate 37 closed. However, pin 57 may be removed when it is desired to open the gate. After pivoting brace 55 about bolt 56, pin 57 may be inserted through brace 55 and an opening 58 in member 48 to retain gate 37 against the right side panel in the open position shown in broken lines in FIG. 3. At least one short angle section 59 (FIG. 1) is welded to post 14 at a location to engage one of the flanges of member 46 to limit the inward swinging of gate 37 to the closed position shown in solid lines in FIG. 3. Gate 36 is hingedly mounted to post 13 in a similar manner. Referring to FIGS. 1 and 2, a pair of hinge sleeves 60 and 61 are welded to the corner of post 13 in vertically spaced relationship. A pair of bent hinge pins 62 and 63 are welded to member 38. Pins 62 and 63 include vertical portions which rotatively fit in sleeves 60 and 61 to mount gate 36 for opening and closing movement similar to that described in connection with gate 37. A brace 64 extends between members 22 and 40 to retain gate 37 closed. A pin 65 which attaches one end of brace 64 to member 40 may be removed, and after brace 64 has been pivoted into position to retain the gate open, pin 65 may be inserted through brace 64 and member 40 to retain gate 36 open against the right side panel in much the same manner as described in connection with gate 37. A pair of short angle sections 66 and 67 are welded to post 13 to engage member 38 and thereby limit the inward swinging of gate 36 to the closed position shown in FIG. 1.

To further assist in holding gates 36 and 37 closed, a short angle section 68 (FIG. 1) is pinned between adjacent portions of members 40 and 48. Another angle section 69 is pinned between adjacent portions of members 41 and 49. It is noted that gates 36 and 37 may be removed from the feed rack by removing pins 57 and 65 and then lifting the gates to withdraw the hinge pins from their sleeves.

A fork lift for handling large hay bales is generally designated by numeral 70. As shown in FIGS. 1 and 2, angle sections 71, 72 and 73 are welded to central portions of the respective members 15, 16 and 17 on the front panel of the feed rack 10. These angle sections are all welded with their flanges edge to edge with the front panel members in order to provide box like structures on the front panel for engagement with fork lift 70 to couple the lift with the feed rack.

The fork lift includes a horizontal beam 74 at its bottom portion. Upright posts 75 and 76 extend upwardly from beam 74 somewhat inwardly of the ends thereof, and a cross member 77 extends between the upper ends of posts 75 and 76. Gusset plates 75a and 76a reinforce the connections of posts 75 and 76 to beam 74.

Spaced forks 78 and 79 of the fork lift entend rearwardly from beam 74 at locations near posts 75 and 76. Forks 78 and 79 are preferably tubular members which are secured to extend from triangular plates 80 and 81 which are in turn securely welded to box beam 74. L-shaped braces 80a and 81a extend along plates 80 and 81 and posts 75 and 76 to strengthen the connections. Sleeves 82 and 83 are sleeved over forks 78 and 79 in order to increase the strength and durability of the forks. As best shown in FIG. 3, forks 78 and 79 diverge somewhat as they extend rearwardly to present an enlarged span between the rearward ends of the forks. The forks are substantially as long as the length of feed rack 10 so that they are able to be inserted completely beneath a hay bale contained within the feed rack.

Cast iron tips 84 and 85 are welded on the rearward ends of the respective forks 78 and 79. Tips 84 and 85 present sharply pointed ends on the forks which facilitate the insertion of the forks beneath a hay bale. The inwardly facing sides of the tips 84 and 85 are smoothly rounded, while the outer side of each tip is flattened, as best shown in FIG. 3. It has been found that this particular configuration of the tips improves their effectiveness in handling large hay bales and facilitates the loading and unloading of the bales.

A notched arm or plate 86 is secured to the inward side of post 75 at an intermediate location thereon. Plate 86 projects to the rear of post 75 and is provided with a square notch 86a on its upper edge. Notch 86a is sized to closely fit around the square box structure provided by member 17 and angle section 73, as shown in FIG. 2. Post 76 is provided with an identical plate 87 which projects to the rear of the post. A square notch 87a is formed in the top edge of plate 87 at a location aligned with notch 86a. Notch 87a likewise fits closely around member 17 and angle section 73.

Arms 88 and 89 are secured to the outer sides of the respective posts 75 and 76. Arms 88 and 89 project at inclined angles above the posts and slightly to the rear thereof. Laterally aligned notches 88a and 89a are formed in the top ends of arms 88 and 89 to register with the box structure presented by member 16 and angle section 72, as shown in FIG. 2.

Hitch pins 90 and 91 extend horizontally from the outer sides of posts 75 and 76. Pins 90 and 91 are axially aligned with one another and are adapted to be pinned to two of the hitch arms of a three point tractor hitch, as shown in FIGS. 2 and 3.

The third point of the tractor hitch is connected between a pair of upright angles 92 and 93 which are secured to extend between beam 74 and cross member 77. Somewhat below its top end, each angle 92 and 93 is provided with an opening 94 (FIG. 1). A pin 95 (FIG. 2) is extended through openings 94 to secure to the third or upper arm of the tractor hitch to the fork lift. This manner of connecting the fork lift to the tractor enables the fork lift to be raised and lowered by the hydraulic system of the tractor.

A square plate 96 is welded between angles 92 and 93, and a horizontally oriented sleeve 97 extends rearwardly from plate 96. A lance member 98 is fit in sleeve 97 and secured therein by a pin 99. The rearward end of lance 98 is pointed in order to penetrate a large hay bale at the approximate center thereof.

In use, the feeding rack 10 is positioned on the ground at a location forwardly of a large hay bale which is indicated at 100 in FIG. 2. Gates 36 and 37 are opened and held open by braces 55 and 64. The fork lift 70 is coupled to the three point hitch of a tractor, and the tractor is backed up until the fork lift engages the front panel of the feeding rack. As this occurs, forks 78 and 79 are inserted beneath member 15, plates 86 and 87 are inserted beneath member 17, and arms 88 and 89 are inserted beneath member 16. Further backing of the tractor causes the fork lift to begin sliding the feed rack rearwardly on side rails 20 and 28, which slide easily along the ground without catching due to their curved rearward ends.

As the feed rack slides rearwardly, the hay bale 100 enters the rack through the opening presented by the open rear gates 36 and 37. Also, forks 78 and 79 are inserted beneath the bale and lance 98 penetrates the center of the bale. The gates 36 and 37 are then preferably closed, although it is possible for them to remain open during transport of the bale.

To raise hay bale 100 and rack 10 for transport, the hydraulic system of the tractor is actuated to raise fork lift 70. This raises the hay bale above the ground on forks 78 and 79. In addition, when lift 70 has been raised slightly, notches 86a and 87a register with the box structure of members 17 and 73, and notches 88a and 89a register with the box structure of members 16 and 72, as shown in FIG. 2. Further raising of the fork lift raises rack 10 above the ground where it is thereafter supported on plates 86 and 87 and arms 88 and 89. The tractor may then be driven off to deposit the bale at the desired location. It is preferred that the bale be carried only a short distance above the ground so that a low profile is achieved and greater stability is obtained during transport.

To unload the bale, fork lift 70 is lowered to the ground. This also lowers rack 10 and hay bale 100 to the ground. Once side rails 20 and 28 have reached the ground, further lowering of the fork lift disengages notches 86a, 87a, 88a and 89a from the front panel of the feed rack. Since the fork lift and feed rack are then uncoupled, the tractor may be driven forwardly to withdraw forks 78 and 79 from beneath the hay bale and to separate the lift 70 from rack 10. The bale is thus unloaded on the ground and is enclosed within rack 10 to permit animals to feed on the bale through the bars of the feeding rack.

The fork lift 70 may thereafter be employed with other feeding racks to handle additional bales, or the lift may be uncoupled from the tractor if it is not to be used further.

It is contemplated that fork lift 70 may sometimes be used by itself without a feeding rack to move large hay bales around in the field. In this situation, the lance 98 is particularly advantageous because it assures that the bale will remain on forks 78 and 79 during transport.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. Hay handling apparatus comprising:
   a feed rack having a plurality of interconnected panels, said panels including a plurality of bars spaced apart from one another to accommodate the heads of animals therebetween;
   a gate structure on said feed rack cooperating with said panels to present an enclosure having a size to accommodate a hay bale therein, said gate structure being movable to provide an opening in said enclosure of a size to receive the hay bale;
   a lift operable to supportively receive and raise the hay bale above the ground for transport within said enclosure;
   means for coupling said feed rack and lift together to effect raising of the feed rack above the ground in response to raising of the lift, said coupling means automatically releasing to separate the lift from the feed rack upon lowering of said lift to the ground; and
   means adapted to hitch said lift to a towing vehicle.

2. Apparatus as set forth in claim 1, wherein said coupling means includes a pair of laterally spaced arm members projecting from said lift, each of said arm members having a notch therein registering with a portion of said feed rack upon raising of said lift.

3. Apparatus as set forth in claim 2, including a box structure formed on said portion of said feed rack for registration with said notches.

4. Apparatus as set forth in claim 2, wherein said coupling means further includes a second pair of arm members projecting from said lift at locations above the first mentioned pair of arm members, each arm member in said second pair having a notch therein registering with a second portion of said feed rack upon raising of said lift.

5. Apparatus as set forth in claim 1, wherein said lift includes a pair of rearwardly extending forks spaced apart from one another for insertion beneath the hay bale, each of said forks having a pointed tip member on the rearward end thereof, said tip members having smoothly curved surfaces facing one another and substantially flat surfaces facing away from one another.

6. Apparatus as set forth in claim 5, wherein said forks diverge as they extend rearwardly.

7. Apparatus as set forth in claim 1, wherein said lift includes a pair of rearwardly extending forks spaced apart from one another for insertion beneath the hay bale and a rearwardly projecting lance member spaced above said forks to penetrate the hay bale.

8. Apparatus as set forth in claim 1, wherein said feed rack includes opposite sides having runners at the bottom thereof for sliding along the ground, each runner being curved upwardly at the rearward end thereof to facilitate its sliding to the rear.

9. Apparatus as set forth in claim 1, wherein said feed rack includes opposite side panels, said gate structure comprising:
- a pair of gates hingedly connected to the opposite side panels for opening and closing movement, said gates cooperating to extend between the side panels when closed;
- a brace for each gate, said braces extending between said gates and the corresponding side panels in a first position to retain the gates closed, said braces being releasable to permit opening of said gates; and
- releasable means for securing said braces in extension between said gates and the corresponding side panels in a second position to retain the gates in open positions disposed generally alongside the respective side panels.

10. Apparatus as set forth in claim 1, wherein said feed rack includes a pair of side panels engageable with the ground to support said rack thereon and a front panel spaced above the ground, said lift including a pair of forks insertable beneath said front panel.

* * * * *